US008499041B2

(12) United States Patent
Fiedorowicz et al.

(10) Patent No.: US 8,499,041 B2
(45) Date of Patent: Jul. 30, 2013

(54) COLLABORATIVE BROWSING AND RELATED METHODS AND SYSTEMS

(75) Inventors: Jeff A. Fiedorowicz, Issaquah, WA (US); Emily Yanxin Wang, Sammamish, WA (US); Jeffrey H. Albert, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 567 days.

(21) Appl. No.: 12/360,059

(22) Filed: Jan. 26, 2009

(65) Prior Publication Data
US 2010/0191799 A1 Jul. 29, 2010

(51) Int. Cl.
*G06F 15/16* (2006.01)

(52) U.S. Cl.
USPC ........................................................ 709/205

(58) Field of Classification Search
USPC ................ 709/200–227; 705/6, 1, 28, 26, 27, 705/56; 345/751
See application file for complete search history.

(56) References Cited

U.S. PATENT DOCUMENTS

| | | | | |
|---|---|---|---|---|
| 7,424,541 | B2 * | 9/2008 | Bourne | 709/227 |
| 2002/0085030 | A1 * | 7/2002 | Ghani | 345/751 |
| 2004/0186738 | A1 * | 9/2004 | Reisman | 705/1 |
| 2006/0168538 | A1 * | 7/2006 | Stevens et al. | 715/779 |
| 2008/0005087 | A1 * | 1/2008 | Sato et al. | 707/3 |
| 2009/0240516 | A1 * | 9/2009 | Palestrant | 705/1 |
| 2009/0260060 | A1 * | 10/2009 | Smith et al. | 726/3 |
| 2010/0005087 | A1 * | 1/2010 | Basco et al. | 707/5 |

OTHER PUBLICATIONS

Google, 'Google Docs', Wikipedia, the free encyclopedia, Jan. 22, 2008, p. 1-9.*
Whitehead et al., 'WEBDAV: IETF Standard for Collaborative Authoring on the Web', IEEE Internet Computing, Sep.-Oct. 1998, p. 1-8.*
Attila Bodis, http://googleblog.blogspot.com/2007/09/our-feature-presentation.html, Sep. 17, 2007, pp. 1-5.*
Rose et al. 'Google Docs Blog' http://googledocs.blogspot.com/2008_01_01_archive.html, on or before Jan. 25, 2008, pp. 1-50.*
Furmanski, Chris, David Payton, Mike Daily; "Quantitative Evaluation Methodology for Dynamic, Web-Based Collaboration Tools"; Proceedings of the 37th Annual Hawaii International Conference on System Sciences (HICSS'04)—Track 5, 2004.

(Continued)

*Primary Examiner* — Joseph Avellino
*Assistant Examiner* — Mark O Afolabi
(74) *Attorney, Agent, or Firm* — Harness, Dickey & Pierce, P.L.C.

(57) ABSTRACT

A system for facilitating collaboration among users via a network includes a server and user computers. Each user computer has a browser client configured with the server to provide collaborative services relative to applications invoked by users on the user computers. The browser clients and the server make available to each user computer, in web format, content from heterogeneous content sources, at least some content obtained via the applications. The browser clients are configured with the server to capture in a web layer and make available to the user computers explicit social information and implicit social information provided by the users via the browser clients using the collaborative services.

17 Claims, 5 Drawing Sheets

OTHER PUBLICATIONS

O'Reilly, Tim; "What Is Web 2.0: Design Patterns and Business Models for the Next Generation of Software"; O'Reilly Media, Sebastopol (CA), USA; Sep. 30, 2005.

Bouthors, V. and O. Dedieu; "Pharos, A Collaborative Infrastructure for Web Knowledge Sharing"; In ECDL, London, UK, 1999.

Lerman, K. and L. A. Jones; "Social Browsing on Flickr"; In Proceedings of the International Conference on Weblogs and Social Media (ICWSM'07), Boulder, CO, Mar. 2007.

* cited by examiner

COLLABORATIVE BROWSING AND RELATED METHODS AND SYSTEMS

FIELD

The present disclosure relates generally to computer networking systems and more particularly (but not exclusively) to a team-oriented browsing system that provides collaborative services.

BACKGROUND

The statements in this section merely provide background information related to the present disclosure and may not constitute prior art.

For many people and organizations, the Internet has become a main information and knowledge repository, and web browsers have become a universal working platform. When people working together to accomplish a task are able to collaborate via the Internet, enhanced productivity is often the result.

SUMMARY

In one implementation, the present disclosure is directed to a system for facilitating collaboration between two or more users via a network. The system includes a server and two or more user computers including processors and memory, each user computer having a browser client configured to perform browsing on the network. The browser clients are configured with the server to provide a plurality of collaborative services relative to one or more applications invoked by one or more of the users on one or more of the user computers. The browser clients are further configured with the server to make available to each user computer, in web format, content from one or more of a plurality of heterogeneous content sources, at least some of the content obtained via the one or more applications. Further, the browser clients are configured with the server to capture in a web layer and make available to the user computers explicit social information and implicit social information provided by the users via the browser clients using the collaborative services.

In another implementation, the disclosure is directed to a tangible computer-readable medium having instructions encoded thereon. The instructions are executable by one or more processors of a system having a server and two or more user computers including processors and memory, each user computer having a browser client configured to perform browsing on a network. The instructions are executable to provide a plurality of collaborative services relative to one or more applications invoked by one or more users on one or more of the user computers. The instructions are further executable to make available to each user computer, in web format, content from one or more of a plurality of heterogeneous content sources, at least some of the content obtained via the one or more applications. The instructions are further executable to capture in a web layer and make available to the user computers explicit social information and implicit social information provided by the users via the browser clients using the collaborative services.

In yet another implementation, the disclosure is directed to a method of facilitating collaboration between two or more users via a network. The method is performed by one or more processors of a system having a server and two or more user computers including processors and memory. Each user computer has a browser client configured to perform browsing on the network. The method includes providing, through the server and browser clients, a plurality of collaborative services relative to one or more applications invoked by one or more of the users on one or more of the user computers. The method further includes making available to each user computer, in web format, content from one or more of a plurality of heterogeneous content sources, and obtaining at least some of the content via the application(s), and capturing in a web layer and making available to the user computers explicit social information and implicit social information provided by the users via the browser clients using the collaborative services. A collaborative environment is provided in which the explicit social information and implicit social information are integrable by the users to guide the collaboration.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. It will be understood by those knowledgeable in the art that a plurality of types and numbers of hardware devices, including but not limited to computers, processors, memory, microcomputers, microprocessors, input-output devices, communications devices, etc. could be used to implement methods and systems described in the disclosure.

In various implementations, an enhanced web browsing system is provided that allows a user to perform normal web navigation to browse and/or search web content. Additionally, the browsing system may allow members of a team that includes the user to see, e.g., one another's navigation footprints, annotations, and other information augmentation relative to the browsed/searched web content. Various tools are provided for users to collaborate, e.g., on a project, mission or other topic. Users may collaborate in real time and/or over time.

Figure 1:
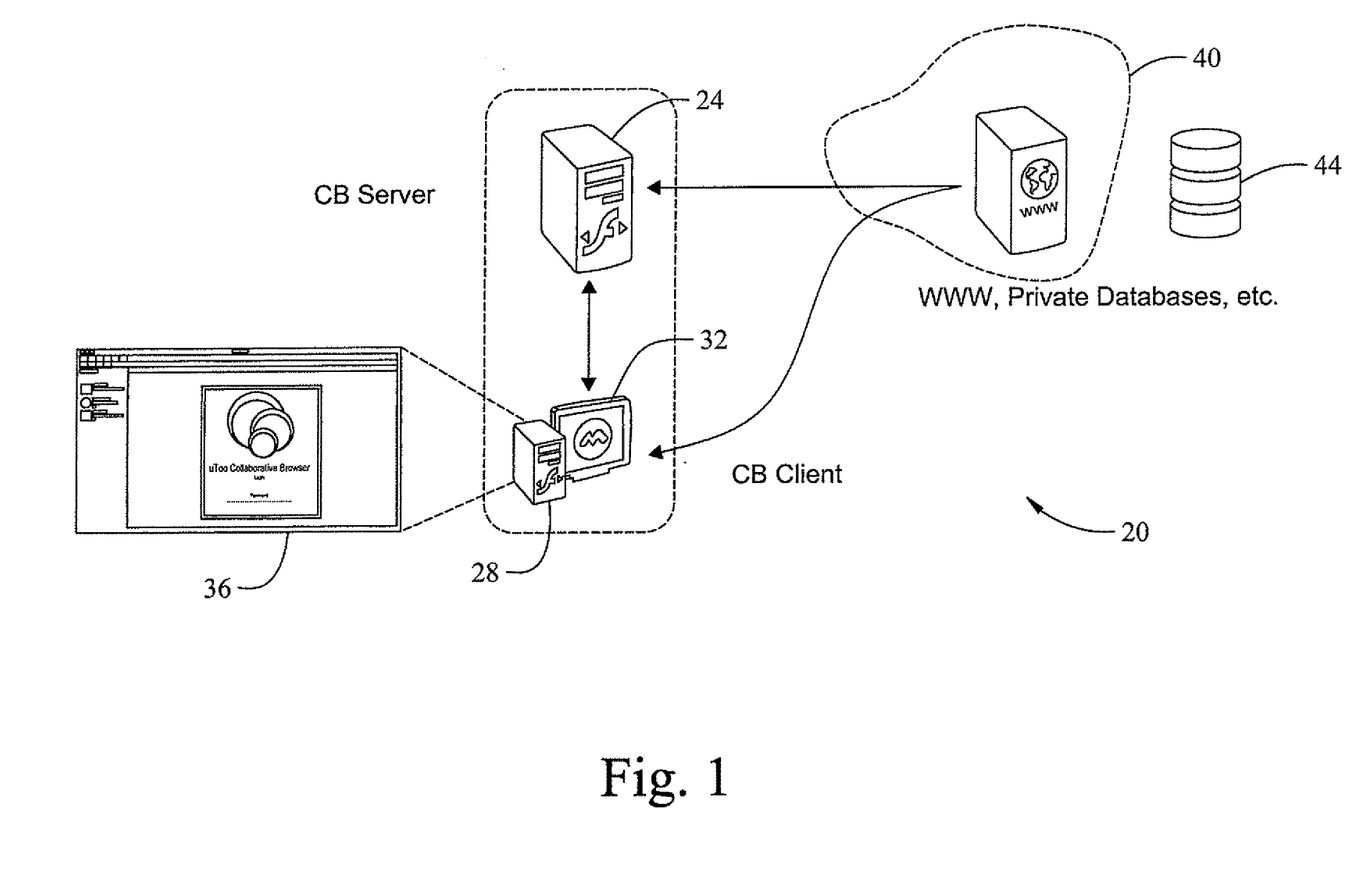
FIG. 1 is a diagram of a system for facilitating collaboration between two or more users via a network in accordance with one implementation of the disclosure.

One implementation of a system for facilitating collaboration between two or more users via a network is indicated generally in FIG. 1 by reference number 20. The system 20, which may be part of an enterprise system, includes a server 24 and two or more user computers 28 including processors and memory. A single user computer 28 is shown in FIG. 1. Each user computer 28 includes a display 32. Each user computer 28 also has a software browser client 36 configured thereon to perform browsing on a network 40, which in the present implementation is the Internet.

Figure 2:
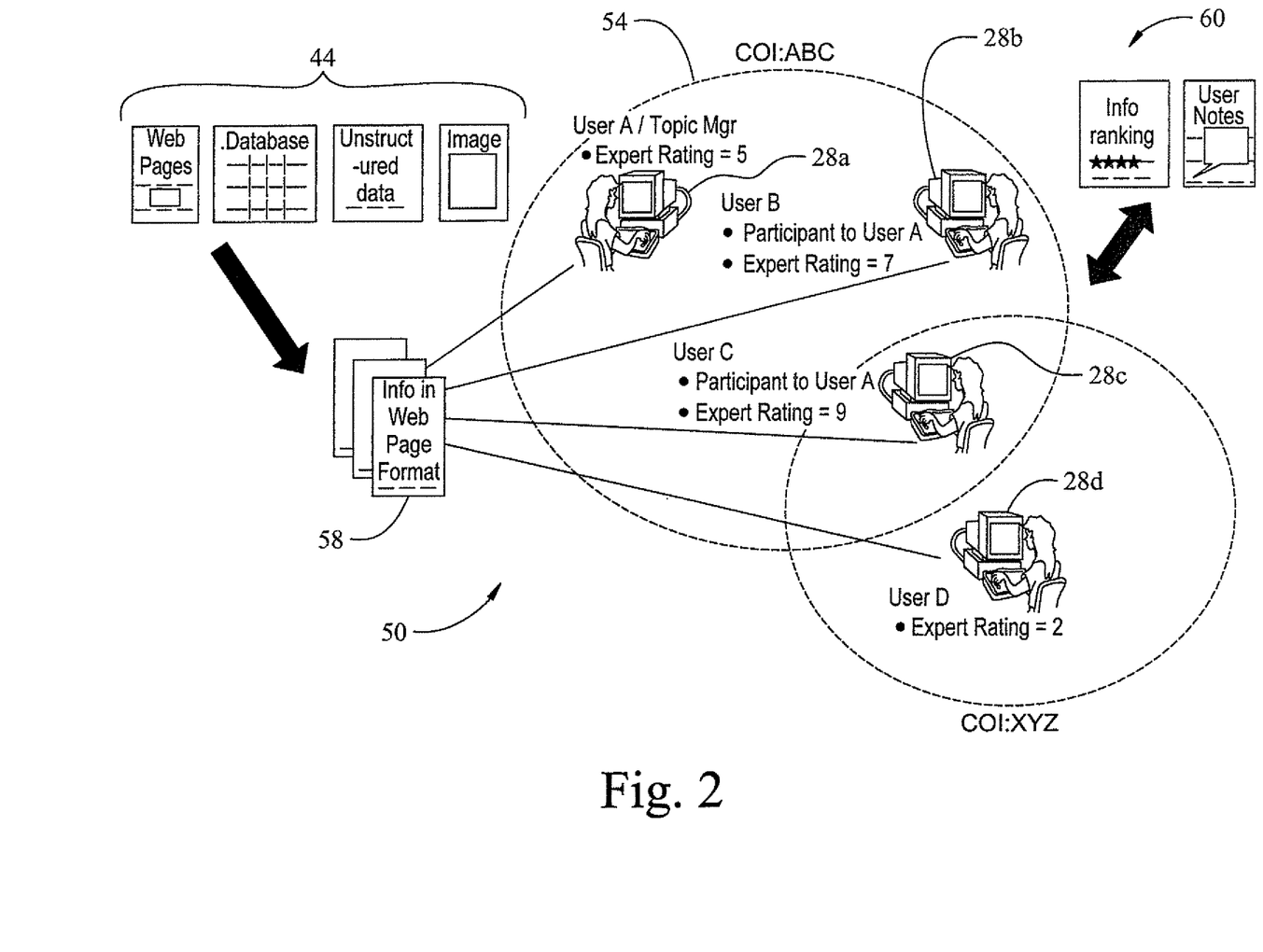
FIG. 2 is a conceptual diagram of a system for facilitating collaboration between two or more users via a network in accordance with one implementation of the disclosure.

One implementation of a system for facilitating collaboration is shown conceptually in FIG. 2 and is indicated generally by reference number 50. A plurality of users having user computers 28a-28d are members of a plurality of communities of interest (COIs) 54. Two overlapping COIs 54 are shown in FIG. 2. Referring to FIGS. 1 and 2, the server 24 and browser clients 36 are configured to provide a plurality of collaboration services relative to one or more applications invoked by the users on the user computers 28a-28d. The browser clients 36 are configured with the server 24 to make content 58 available to each user computer 28 in web format. The content 58 is obtained from one or more of a plurality of heterogeneous content sources 44. At least some of the content source content may be obtained via the user-invoked application(s). Content sources 44 may include databases, the World-Wide Web and other Internet data sources, real-time data feeds, etc. The server 24 and browser clients 36 are also configured to capture social information 60 in a web layer and make the social information available to the user computers 28. The social information 60 includes explicit social information and implicit social information provided by the users via the browser clients 36 using the collaborative services.

The term "explicit social information" is used in the disclosure and the claims to refer to information explicitly provided by a user to augment web content, e.g., in order to share such information with other users. Explicit social information may include, without limitation, comments, annotations, user ratings of web content, bookmarks, and/or tagging of content to annotate and/or categorize the content. The term "implicit social information" is used in the disclosure and the claims to refer to information implicitly provided by a user, e.g., through the user's actions in accessing a network. Implicit social information may include, without limitation, user footprints in a network, e.g., which websites are visited, click-through of search results, length of time a user stays on a page, etc.

Figure 3:
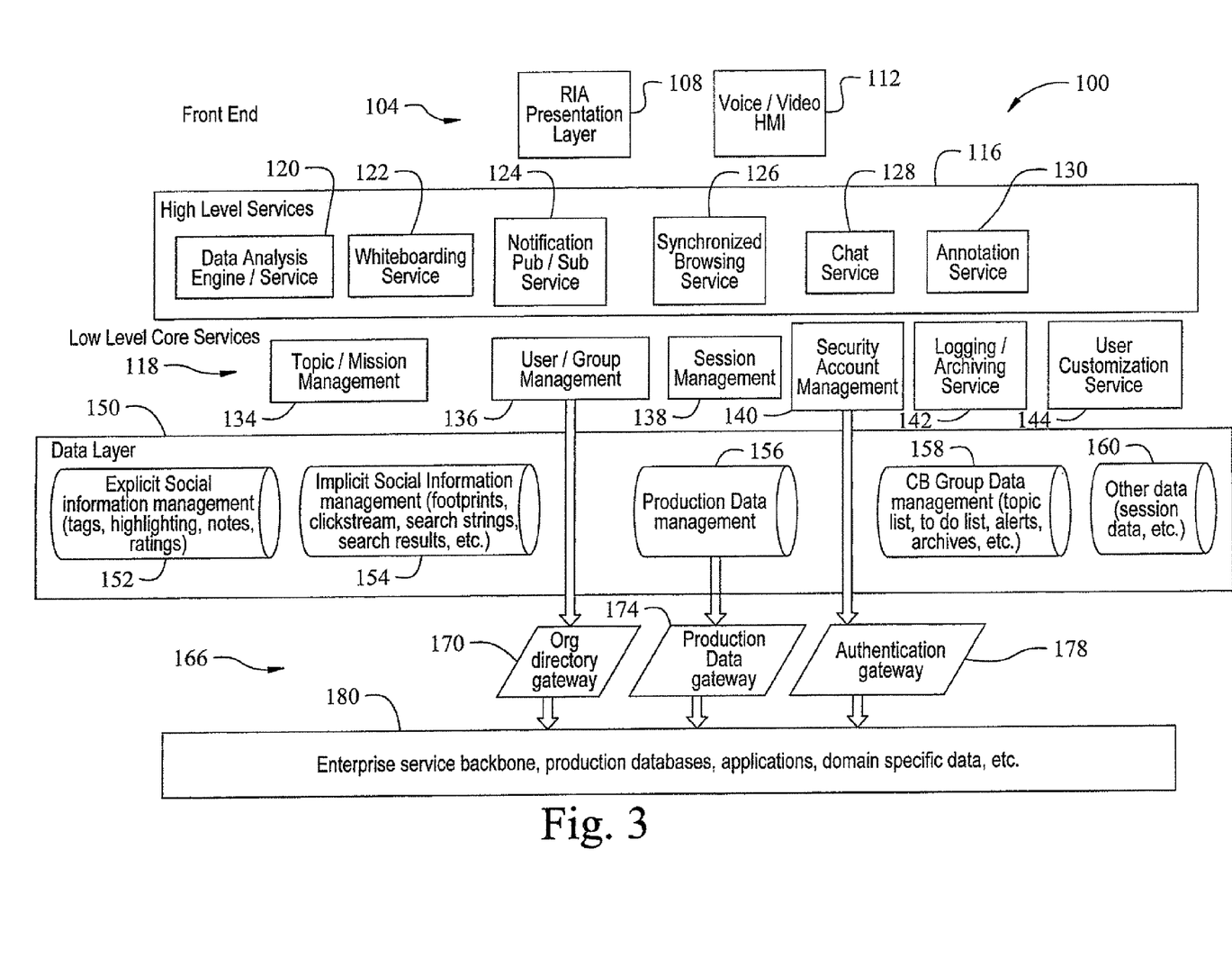
FIG. 3 is a diagram of functional components of a system for facilitating collaboration between two or more users via a network in accordance with one implementation of the disclosure.

Functional components of the system 20 are indicated generally in FIG. 3 by reference number 100. A front end 104 includes a rich Internet application (RIA) layer 108 and a voice/video human-machine interface (HMI) 112. User interface configurations may include three-dimensional (3D) user interfacing, e.g., for organizing information and allowing drag-and-drop manipulation of web data objects.

High-level services 116 and low-level core services 118 reside, e.g., on the server 24. High-level services 116 include a data analysis engine/service 120. Social information not only may be captured and stored but also may be analyzed and indexed for guiding collaboration. The data analysis engine/service 120 includes a semantic engine that may be used to process and organize captured data and present users with a semantic view of data contents. High-level services 116 also include a whiteboarding service 122, a notification publisher/subscriber service 124, a synchronized browsing service 126, a chat service 128, and an annotation service 130. Low-level core services 118 include topic/mission management 134, user/group management 136, session management 138, security/account management 140, a logging/archiving service 142, and a user customization service 144. It should be noted that other or additional high-level and/or low-level services relating to collaboration and content presentation could be included in various implementations.

In various implementations, the browser clients 36 are configured to provide a collaborative environment in which explicit social information and implicit social information are integrable by the users to guide collaboration. Both synchronous collaboration and asynchronous collaboration are supported through components of the system 20. The term "synchronous collaboration" may be used to indicate that users collaborate at substantially the same time and that collaboration turn-around is substantially instant. Synchronous collaboration may be supported, for example, by the chat service 128. Synchronous collaboration also may be supported when browsing is synchronized, i.e., where all users view the same screen contents at the same time. In asynchronous collaboration, users do not need to collaborate at the same time. Social tagging is an example of asynchronous collaboration.

Data management is performed, e.g., at a data layer 150. Management functions include explicit social content management 152, implicit social content management 154, production data management 156, group data management 158, and management 160 of session data and other types of data. Gateway functions 166 are performed relative to various enterprise resources 180. Specifically and for example, an organization directory gateway 170 connects with enterprise directory services and provides organization data that may be used, e.g., for team management and roles assignment. Information as to job titles and organization roles can be used for expertise rating. A production data gateway 174 connects, e.g., with one or more production databases and domain-specific data sources from which data may be imported for viewing and processing. An authentication gateway 178 manages user enterprise accounts and authenticates users through enterprise authentication services.

The system 20 allows users to augment web content with information such as tags, notes, and ratings and to share them with other users. The system 20 captures users' web browsing/searching behaviors and may use the behaviors, e.g., as a social indexing mechanism to facilitate information-seeking by the users. The system 20 also provides mission/topic management and user management to expedite ad-hoc group formation and group decision support for a project or mission. The system 20 also provides data connectors so that production databases can be imported, manipulated, and mashed up with web-based data through the browser client 36. The system 20 also provides collaboration tools including but not limited to chat, whiteboarding, synchronized browsing, and/or notification subscribing/publishing through the collaborative browser 36 to facilitate synchronous and/or asynchronous collaboration.

In various implementations, users who are collaborating may apply priority-based filtrations to data in a collaboration environment in which the filtrations are visible to the users. A display screen configuration in accordance with one implementation of the disclosure is indicated generally in FIG. 4 by reference number 200. The screen 200 pertains to a military scenario, although substantially any subject matter, including but not limited to commercial applications, could be appropriate for collaboration in accordance with the disclosure. In the exemplary scenario to which the display screen 200 pertains, intelligence analysts collaborate together to track a terrorist. A left bar 204 provides a window that shows collaboration information. The bar 204 includes several sections 206, each of which may be maximized or minimized by a user. Sections 206 include, e.g., a section 208 describing a topic being analyzed and a section 210 describing topic participant information. In the section 210, topic participants/team members 212 are listed along with, e.g., their current statuses and expertise levels and information pertaining to their website visiting. When a user hovers a user computer cursor over one participant 212, a pop-up menu (not shown) displays what the user may do with the participants, including, e.g., "chat", "request synchronized browsing", "start a private whiteboard", etc. A group workspace section 220 may be expanded to provide a session workspace. The group workspace 220 may be used, e.g., to store group working artifacts, group documents, group chat histories, etc. A whiteboarding section 222 may be expanded to provide a session whiteboard. Sections 206 also include a data sources section 226 that may be expanded to provide a list of sources of data being used in an analysis.

Figure 4:
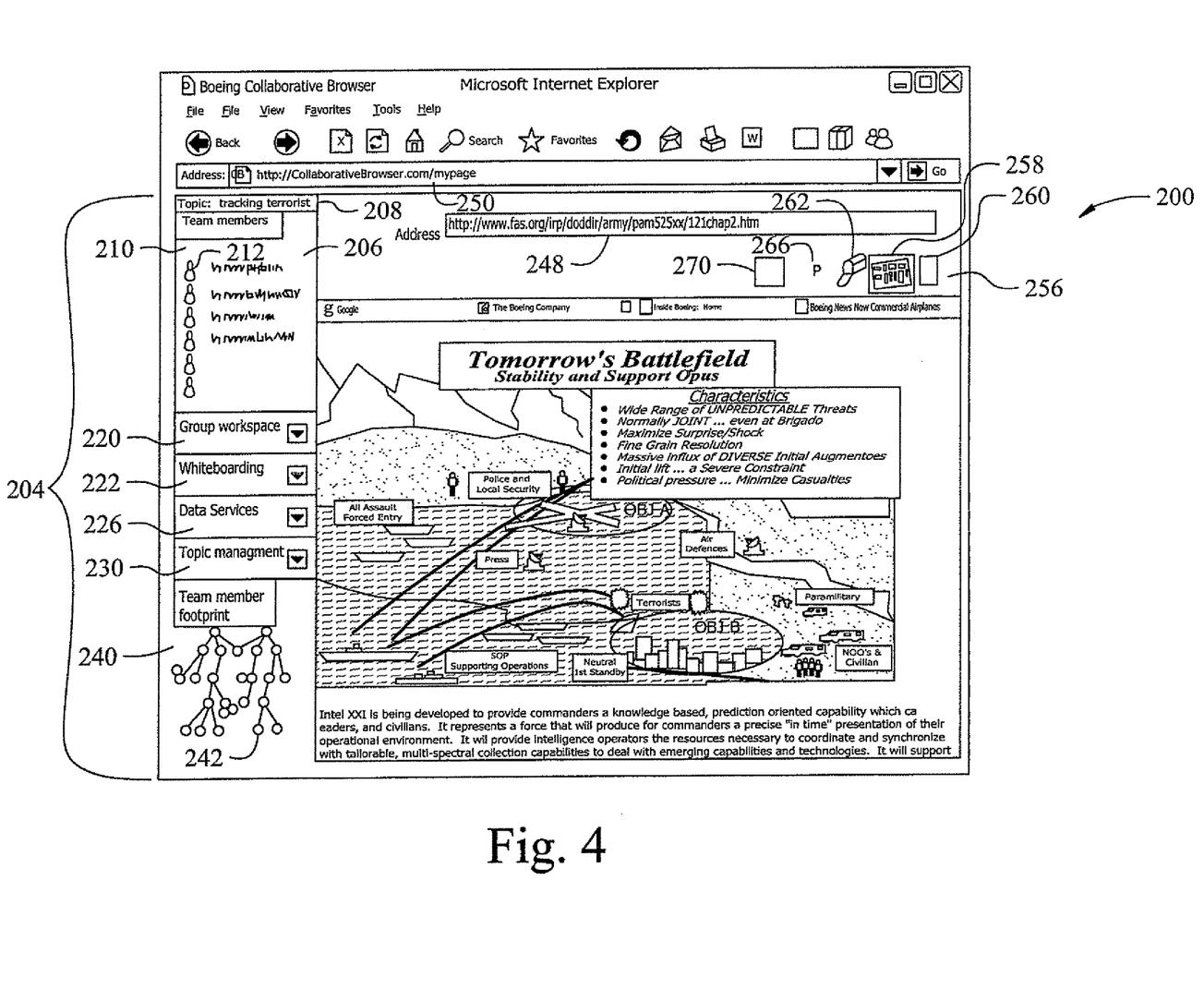
FIGS. 4 and 5 are illustrations of display screen configurations in accordance with implementations of the disclosure.

When a topic management section 230 is maximized, a user may see a list of topics/missions in which the user participates. If the cursor is hovered over a topic, a pop-up menu of available operations is displayed. Menu items may include, e.g., "switch to the topic", "start a new topic", and "topic management" if the user is the topic manager of the topic. When a topic manager clicks on the menu item "topic management", a new tab is started in the browser client 36 to enable the topic manager to define a topic, close a topic, remove participants from a topic, add participants to a topic, assign roles of participants, etc. A company/group organization book may be used by the system 20 in adding, removing, or assigning roles relative to participants.

A participant footprint section 240 may be expanded to display past footprints 242 by participants. The footprints 242 are organized by a semantic tree that may be zoomed out and in to provide different detail levels.

A user may use an address field 248 to input an address from which to obtain a content source. Various types of data connectors may be provided for various types of data sources. For example, for a structured data source such as a database, a data connector may be implemented to connect to the data source and retrieve, modify and/or add data to the data source. For an unstructured data source such as a text document, a data connector may be implemented to perform file operations and/or read and/or write from the data source. Additionally or alternatively, the user may use an address field 250 to enter addresses to perform browsing on the Internet 40 in the usual known manner. A main section 254 displays web-formatted content being browsed.

A bar 256 displays a plurality of icons by which a user can toggle collaboration modes. When a user cursor is hovered over an icon 258, a pop-up menu is displayed that includes items such as "turn on/off annotation", "add a webnote", and "delete selected webnotes". A user may click on "turn on/off annotation" to toggle a display of webnotes on the current content page. A user may click on "add a webnote" to add a new sticky webnote to a current location. A user may click on "delete selected webnotes" to delete selected webnotes.

When a user cursor is hovered over an icon 260, a pop-up menu is displayed that includes items such as "turn on/off highlighting", "start highlighting", "end highlighting", and "delete selected highlighting". A user may click on "turn on/off highlighting", to toggle a display of highlighting on the current content page. When a user clicks on "start highlighting", the user's cursor becomes a highlighting pen and may be clicked on the content page to add highlights to the page. When a user clicks on "delete selected highlighting", selected highlights are deleted.

When a user cursor is hovered over an icon 262, a pop-up menu is displayed that includes items such as "subscribe to notifications", "publish notifications", and "turn on/off notifications". A user may click on "subscribe to notifications" to start a new tab in the browser window to enable the user to subscribe to various kinds of notifications, such as team member status changes, new topics, activities in different topics, etc. An icon 266 may be activated to toggle between private mode and public mode. Private mode converts performance of the browser client 36 to normal browsing mode, in which neither browsing information nor status of the user is recorded or shared. When a user cursor is hovered over an icon 270, a pop-up box displays rating by participants of the current content source.

Figure 5:
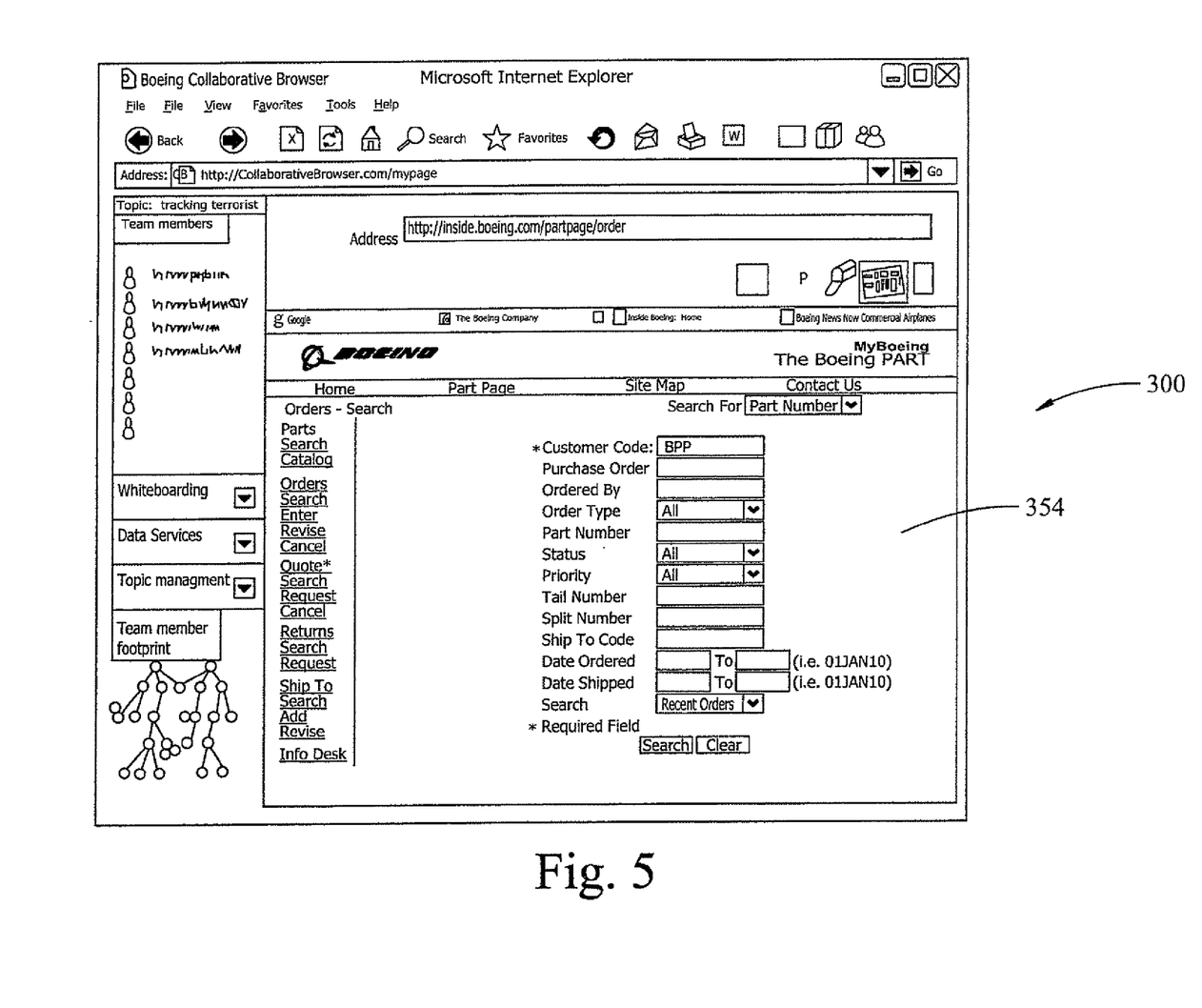

Another display screen configuration in accordance with one implementation of the disclosure is indicated generally in FIG. 5 by reference number 300. The screen 300 pertains to a commercial scenario in which members of an AOG (Aircraft On the Ground) team collaborate to decide on a part delivery option. A main section 354 displays content provided by an application for ordering parts and web-formatted, e.g., by the browser client 36 of a user computer displaying the screen 300.

Topic Management

The system 20 may perform a plurality of functions pertaining to topic management, including, e.g., the following. The system 20: (a) provides a user with an ability to create a topic, (b) provides a topic manager with an ability to add a participant to a topic, (c) provides a topic manager with an ability to remove a participant from a topic, (d) provides a user with an ability to view all topics he/she is currently a participant of, (e) provides an individual an ability to request access to a topic he/she is not currently a participant of, (f) provides a topic manager with an ability to define/update the purpose, goal and topic definition text of a current topic, (g) provides a topic manager with an ability to archive a current topic, (h) provides a topic manager with an ability to delete a topic, (i) allows a topic to exist regardless of the online status of any of the current participants, (j) supports RSS-type public and private feeds, to allow other parties to discover new collaborations, (k) allows a user to accept or decline an invitation to a topic, (l) provides a topic manager with a list of topics from other topic managers that are similar or related to a current topic, (m) provides a topic creator with an ability to promote a participant to a topic manager, (n) provides a topic creator with an ability to demote a topic manager, (o) provides a topic manager with an ability to define/update a purpose, goal and session definition text of a current session, and (p) uniquely identifies each session within a topic to facilitate reference to each session.

Topic Participant Information

Functions performable by the system 20 pertaining to topic participant information include the following. The system 20: (a) provides a user with an ability to operate in a public mode, where all activity is visible to other participants, (b) provides a user with an ability to operate in a private mode, where all activity is hidden from other participants, (c) provides a user with an ability to select which aspects of his/her session are public and private to other participants, (d) provides a user with information about participants in a current session, (e) provides a user with information about participants in previous sessions of the same topic, (f) provides a user with information on a participant's current activity level (active, inactive), (g) provides a user with an ability to join an audio/video conference for a current session, (h) provides a user with information on value of information (VOI) expertise, i.e., "expert rating" of participants involved in a current topic, (i) provides a user with an ability to create an "address book" type database of individuals within various communities of interest, (j) provides a user with an ability to use a text-based chat client to communicate with other participants, (k) delivers chat messages to offline participants the next time they join the topic, (l) provides a user with information on a participant's geographic location, (m) provides a user with information about other participants' browsing patterns, (n) archives substantially all chat messages sent between participants, (o) provides a user with an ability to view a chat message history between the user and any participant, and (p) provides a topic manager with an ability to view a chat message history between any participants.

Value of Information

Functions performable by the system 20 pertaining to value of information include the following. The system 20: (a) provides a user with an ability to rate the VOI on a current content source, (b) provides a user with information about a composite VOI of the current content source, (c) provides a user with information about an individual "expert rating" of each participant of a current content source, (d) provides a topic manager with an ability to define/update an expert rating on the topic of any participant, (e) provides a user with an ability to publicly, or anonymously, provides an expert rating about another participant within a current topic, (f) allows a topic manager to delete VOI ratings by participants from a composite VOI for a content source, (g) computes a composite VOI for each content source based on a VOI ranking from each participant, the "expert rating" of each participant, staleness of the source and other factors, (h) provides a user with an ability to display a subset of content sources that meet or exceed an entered VOI level, (i) provides a user with an ability to rate a VOI of a route between two, or more, content sources, (j) provides a user with information about a VOI of a route between two, or more, content sources, (k) provides a user with an ability to create a recommended path of content, (l) provides a user with information about a composite VOI for a set of content sources, previously visited by participants, as returned from a search term, (m) provides a user with information about reliability of a content source, and (n) provides a user with information about staleness of information on a content source.

Search Strings

Functions performable by the system 20 pertaining to search strings include the following. The system 20. (a) stores all search strings used by a participant, (b) provides a user with information on a search term history used to reach each content source visited by any participant, (c) provides a user with an ability to retrieve/reuse any search term previously used by any participant, (d) provides a user with information on content sources, previously visited by participants, as returned from a search term, (e) provides a user with information on content sources, previously unvisited by participants, as returned from a search term, (f) provides a user with information on where a participant began a new search based off of another participant's search tree, (g) provides a user with information on content sources, previously unvisited by the user, for which a VOI has been provided by one or more participants, (h) provides a user with a thesaurus look-up capability for a word in a selected search string, (i) provides a user with an ability to uniquely weight each word in the search string, (j) provides a user with an ability to distribute portions of a returned content sources list to different participants in a topic, (k) provides a user with an ability to uniquely identify any search string with a character descriptive text string, and (l) provides a user with an ability to combine two, or more, previous search strings in an and/or relationship.

Automated Search

Functions performable by the system 20 pertaining to automated search include the following. The system 20: (a) generates suggested unvisited content sources based on the content of a source currently being viewed by a user, (b) provides a user with information on suggested unvisited content sources of interest, (c) provides a user with an ability to sort search results based on VOI ratings of previously visited content sources, and (d) provides a user with information about common content sources and percentage overlap.

Content Source

Functions performable by the system 20 pertaining to content source include the following. The system 20: (a) provides a user with information about any other participants who are currently viewing the same content source, (b) provides a user with an ability to view the currently viewed content source for any session participant(s), (c) provides a user with an ability to view a history of content sources visited by a participant for a topic, (d) provides a user with an ability to tag a content source with any number of user-defined tags, (e) provides a user with an ability to view tags placed on content sources by other participants, (f) provides a user with an ability to search content source history based on participant created tags, (g) provides a user with information about numbers of times each content source has been accessed by a participant, for a current session and complete topic, (h) provides a user with information about time spent on each content source by a participant, for a current session and complete topic, (i) provides a user with information about time since each content source was last visited by any participant for a complete topic, (j) provides a user with an ability to rank order metrics (such as number of visits, time spent and time since last visit) for each content source, (k) provides a user with information on geographic, demographic, etc. content source locations when available, (l) provides a user with an ability to view content sources that have the same tag as a currently viewed and tagged content source, and (m) provides a user with an ability to view a list of multiple content sources corresponding to a single tag.

Annotations

Functions performable by the system 20 pertaining to annotations include the following. The system 20: (a) provides a user with an ability to view annotations created by any participant in a current topic, (b) provides a user with information on which participant created an annotation, (c) provides a user with an ability to highlight a portion of a current content source, (d) provides a user with an ability to create a text-based (e.g., "sticky note") annotation for a portion of a content source, (e) provides a user with an ability to view all annotations, across all content sources, created by any individual participant, (f) allows for a threaded text-based discussion of content sources between participants, (g) allows discussion topics to be posted using a basic subset of HTML tags, (h) allows for a threaded text based discussion of specific annotations, (i) provides a user with an ability to include hyperlinks text based annotations, (j) provides a user with an ability to delay making an annotation viewable by all participants, (k) provides a user with information about which content sources have been annotated by other participants, (l) provides a user with information on when an annotation was created, modified and published, (m) substantially instantly updates annotations when two or more participants are viewing the same content source, (n) provides a user with an ability to control access permissions to annotations, (o) assigns each participant with a unique coding (e.g., color for distinguishing annotations, and (p) provides a user with an ability to delete any annotations created by that user.

Whiteboard

Functions performable by the system 20 pertaining to whiteboarding include the following. The system 20: (a) supports multiple-user-created freeform content sharing spaces, known as "whiteboards", (b) creates a default whiteboard for each new session, (c) provides a user with an ability to create a new session whiteboard, (d) provides a user with an ability to copy/paste information from a content source into an existing whiteboard, (e) provides a user with an ability to add and remove content, as defined by available toolset, from a whiteboard, (f) includes basic shape drawing capabilities within a whiteboard, (g) includes basic freeform drawing capabilities within a whiteboard, (h) includes basic text entry capabilities within a whiteboard, (i) provides a user with an ability to change a stroke and background colors of content, as defined by available toolset, on a whiteboard, (j) provides a user with an ability to post and delete Word, Excel, PowerPoint and PDF documents to/from an existing whiteboard, (k) provides a user with an ability to export an existing whiteboard into another format, (l) provides a user with an ability to view a list of all available whiteboards, (m) provides a user with an ability to display contents of any available whiteboard, (n) maintains a linked reference, back to the content source, for any snippet posted to a whiteboard, (o) substantially instantly updates contents when two or more participants are viewing the same whiteboard, (p) creates a default whiteboard for each new topic, and (q) provides a user with an ability to create a new topic whiteboard.

To-Do List

Functions performable by the system 20 pertaining to to-do listing include the following. The system 20: (a) provides a user with an ability to create one or more "to-do" lists and/or decision checklists, (b) provides a user with an ability to add or modify items within an existing checklist, and (c) allows assigned users to complete a checklist.

Application Behavior

Functions performable by the system 20 pertaining to application behavior include the following The system 20; (a) provides a user with an ability to select an active topic for a current session, (b) allows a user to hide or show content windows within his/her browser window, (c) gathers IP address and other header information on opened content sources, (d) provides a user with an ability to share a session, allowing other participants to view all current activity in real time, and (e) through its software components, provides an application-level interface to create events that can be hooked. Events may be generated, for example, whenever an asset is available.

The system 20 also: (f) provides a user with an ability to send notifications to other participants, (g) provides a user with an ability to request notifications, (h) provides a user with an ability to manage notifications, (i) provides logging of internal events, (j) supports multiple levels of content source security classification, (k) provides a user with an ability to cross between security classification levels without crossing content sources, (l) supports a user with an ability to move or combine information from multiple security classification levels, (m) provides a user with an ability to print any viewable content within the browser, and (n) has a capability to send system-generated notifications to participants.

The foregoing systems and methods provide a way to integrate available internet social information, whether explicit or implicit, and use the information to guide collaboration. A productivity enhancement and group knowledge retention tool is provided for users, e.g., in military or commercial organizations to collaboratively seek information, make decisions, coordinate activities, reach consensus, and complete missions. Implementations of the present system are non-intrusive. That is, they do not obstruct or bring inconvenience to ordinary browsing and navigation activities. The user interface is designed to allow collaboration elements to be non-intrusive and configurable.

Advantageously, the foregoing collaborative browsing system is not a groupware specialized for any particular kind of task. Instead of requiring new collaborative capabilities to be added to each application, by enabling multiple users to collaborate through the foregoing browsing system's collaborative functionality, the collaborative browsing system automatically enhances web based applications with collaborative functionality seamlessly when a user uses it as a browser for the web based application. Users do not need to use different groupware applications to collaborate with different groups of people on different sets of tasks. There is no need for redevelopment of a collaborative version of existing software, or for installation of (or training as to) new collaboration tools.

Implementations of the collaborative browsing system can seamlessly and naturally integrate both explicit and implicit social information to effectively harness community intelligence and to guide collaboration. The system enables the rapid formation of an ad-hoc team and role assignment from organization directory services or email address book, and provides a fast way to interact and mash up with real production databases. The system also automatically enhances web-based applications with collaborative functionality. An implementation of the collaborative browsing system can serve as a general-purpose cross-functional collaboration tool to improve collaboration and synchronization in enterprises including but not limited to business and military intelligence enterprises.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. a system for facilitating collaboration between two or more users in an enterprise via a network, the system comprising a server and two or more user computers including processors and memory, each user computer having a browser client configured to perform browsing on the network;

the browser clients configured with the server to:

provide a plurality of collaborative services relative to one or more applications invoked by one or more of the users on one or more of the user computers, the server having access through a gateway of the enterprise to a plurality of roles of the users maintained in the enterprise, the system configured to assign expert ratings, in accordance with the roles, to the users in one or more communities of interest supported in the system;

make available to each user computer, in web format, content from one or more of a plurality of heterogeneous content sources, at least some of the content obtained via the one or more applications;

capture in a web layer and make available to the user computers explicit social information and implicit social information provided by the users via the browser clients using the collaborative services;

the implicit social information comprising at least a user footprint; and the explicit social information comprising at least one of the following: a tag, an annotation, and a rating; and provide each said user with an ability to:

operate the browser in a public mode, where all activity of the user is visible to other participants; and operate the browser in a private mode, where all activity of the user is hidden from other ones of said users; and operate the browser in a manner that enables the user to select which one of two or more aspects of a browsing session being performed by the user are made public and which one or more aspects of the browsing session are maintained private.

2. The system of claim 1, the server and browser clients configured to present at least some of the content substantially at the same time on the user computers.

3. The system of claim 1, the browser clients configured to perform browsing on the Internet.

4. The system of claim 1, the content comprising data obtained from an enterprise system and from the Internet.

5. The system of claim 1, the collaborative services comprising at least one of the following: a whiteboarding service, a notification publish/subscribe service, a chat service, and an annotation service.

6. a non-transitory computer storage medium having instructions encoded thereon, the instructions executable by one or more processors of an enterprise system having a server and two or more user computers including processors and memory, each user computer having a browser client configured to perform browsing on a network;
the instructions executable to:
access, via a gateway to resources of the enterprise, a plurality of roles assigned in the enterprise to users of the computers, the users belonging to one or more communities of interest in the enterprise system, and assign expert ratings to the users in the one or more communities of interest based on the roles;
provide a plurality of collaborative services relative to one or more applications invoked by one or more users on one or more of the user computers;
make available to each user computer, in web format, content from one or more of a plurality of heterogeneous content sources of the enterprise system, at least some of the content obtained by the server from the enterprise system via the one or more applications and modifiable in the enterprise system via the collaborative services;
capture in a web layer and make available to the user computers explicit social information and implicit social information provided by the users via the browser clients using the collaborative services;
the implicit social information comprising at least a user footprint; and
the explicit social information comprising at least one of the following: a tag, an annotation, and a rating;
switch a performance mode of one of the browser clients between a collaborative mode, where all activity of the one of the browser clients is available to other ones of the browser clients, and a private mode where all activity of the one of the browser clients is hidden from the other ones of the browser clients; and
provide each one of the users with an ability to view a history of content sources visited by a different one of said users for a given topic.

7. The non-transitory computer storage medium of claim 6, further comprising instructions executable by the one or more processors to present at least some of the content substantially at the same time on the user computers.

8. The non-transitory computer storage medium of claim 6, further comprising instructions executable by the one or more processors to provide a whiteboarding service, a notification publish/subscribe service, a chat service, and an annotation service.

9. The non-transitory computer storage medium of claim 6, the instructions executable by the one or more processors without prior modification of instructions encoded in the one or more applications.

10. The non-transitory computer storage medium of claim 6, further comprising instructions executable by the one or more processors to provide data connectors for use in importing, manipulating and/or mashing up production databases with web-based data.

11. a method of facilitating collaboration between two or more users via a network, the method performed by one or more processors of a system having a server and two or more user computers including processors and memory, each user computer having a browser client configured to perform browsing on the network, the method comprising:
providing, through the server and browser clients, a plurality of collaborative services relative to one or more applications invoked by one or more of the users on one or more of the user computers;
making available to each user computer, in web format, content from one or more of a plurality of heterogeneous content sources, and obtaining at least some of the content via the one or more applications, the obtaining including the server using an authentication gateway to authentication services of an enterprise system in which the content resides to authenticate the user relative to a security classification level of the content;
capturing in a web layer and making available to the user computers explicit social information and implicit social information provided by the users via the browser clients using the collaborative services;
the implicit social information comprising at least a user footprint; and
the explicit social information comprising at least one of the following: a tag, an annotation, and a rating;
providing a collaborative environment in which the explicit social information and implicit social information are integratable by the users to guide the collaboration;
providing each said user with an ability to:
operate the browser client in a public mode, where all activity of the user is visible to other participants; and
operate the browser client in a private mode, where all activity of the user is hidden from other ones of said users; and
operate the browser client in a manner that enables the user to select which one of two or more aspects of a browsing session being performed by the user are made public and which one or more aspects of the browsing session are maintained private;
providing each one of the users with an ability to view a history of content sources visited by a different one of said users for a given topic; and
making the collaborative environment available to one or more communities of interest in which the users are rated as experts by the system based on roles assigned by the enterprise to the users and obtained by the server from an organization directory via a gateway to resources of the enterprise.

12. The method of claim 11, further comprising the browser client allowing a user of the system to selectively integrate the explicit social information and implicit social information relative to implementation of a user application on one of the user computers.

13. The method of claim 11, further comprising providing a framework for team management of collaboration participants.

14. The method of claim 11, further comprising the server and one or more of the browser clients importing, manipulating and/or mashing up production databases with web-based data.

15. The method of claim 11, further comprising the browser clients presenting at least some of the content substantially at the same time on the user computers.

16. The method of claim 11, performed without prior modification of instructions encoded in the one or more applications.

17. The method of claim 11, further comprising using a semantic engine to process and organize captured data relating to the captured social information, and to present users with a semantic view of the captured data.

* * * * *